United States Patent
Reed et al.

(10) Patent No.: US 9,433,229 B2
(45) Date of Patent: Sep. 6, 2016

(54) AMORPHOUS CHEWING GUM BULK MATERIAL

(75) Inventors: Michael A. Reed, Merrillville, IN (US); Pamela M. Mazurek, Orland Park, IL (US); Dominic Lettiere, Oak Lawn, IL (US)

(73) Assignee: WM. WRIGLEY JR. COMPANY, Chicago, IL (US)

( * ) Notice: Subject to any disclaimer, the term of this patent is extended or adjusted under 35 U.S.C. 154(b) by 640 days.

(21) Appl. No.: 13/521,512

(22) PCT Filed: Mar. 1, 2011

(86) PCT No.: PCT/US2011/026662
§ 371 (c)(1),
(2), (4) Date: Feb. 27, 2013

(87) PCT Pub. No.: WO2011/109376
PCT Pub. Date: Sep. 9, 2011

(65) Prior Publication Data
US 2013/0149412 A1   Jun. 13, 2013

Related U.S. Application Data

(60) Provisional application No. 61/309,237, filed on Mar. 1, 2010.

(51) Int. Cl.
*A23G 4/06* (2006.01)
*A23G 4/10* (2006.01)
*A23L 1/236* (2006.01)
*A23L 1/09* (2006.01)

(52) U.S. Cl.
CPC . *A23G 4/06* (2013.01); *A23G 4/10* (2013.01); *A23L 1/097* (2013.01); *A23L 1/2364* (2013.01); *A23V 2002/00* (2013.01)

(58) Field of Classification Search
CPC A23G 4/10; A23L 1/097; A23V 2250/6416; A23V 2250/642
See application file for complete search history.

(56) References Cited

U.S. PATENT DOCUMENTS

| | | |
|---|---|---|
| 3,857,965 A | 12/1974 | Ream |
| 4,156,740 A | 5/1979 | Glass et al. |
| 4,238,510 A | 12/1980 | Cherukuri et al. |
| 4,382,962 A | 5/1983 | Devos et al. |
| 4,423,086 A | 12/1983 | Devos et al. |
| 4,466,983 A | 8/1984 | Cifrese et al. |
| 4,671,961 A | 6/1987 | Patel et al. |
| 4,671,967 A | 6/1987 | Patel et al. |
| 4,728,515 A | 3/1988 | Patel et al. |
| 4,753,790 A | 6/1988 | Silva et al. |
| 4,800,095 A | 1/1989 | Carroll et al. |
| 5,120,551 A | 6/1992 | Yatka et al. |
| 5,286,500 A | 2/1994 | Synosky et al. |
| 5,629,042 A * | 5/1997 | Serpelloni ............ A23G 3/04 426/548 |
| 5,637,334 A | 6/1997 | Yatka et al. |
| 5,651,936 A | 7/1997 | Reed et al. |
| 6,017,567 A | 1/2000 | Rosenplenter |
| 8,685,474 B2 | 4/2014 | Barkalow et al. |
| 2004/0234648 A1 | 11/2004 | Mazurek et al. |
| 2005/0202072 A1* | 9/2005 | Buch-Rasmussen et al. ................. 424/448 |
| 2006/0246175 A1 | 11/2006 | Royo |
| 2007/0196534 A1* | 8/2007 | Barkalow ............ A23G 4/062 426/5 |

FOREIGN PATENT DOCUMENTS

| WO | WO9701962 A1 | 1/1997 |
|---|---|---|
| WO | WO9722263 A1 | 6/1997 |

* cited by examiner

*Primary Examiner* — Nikki H Dees

(57) ABSTRACT

A bulk material suitable for use in a chewing gum contains at least about 40 wt. % dry basis sorbitol, at least about 7 wt. % dry basis other than sorbitol, and no more than about 10 wt. % water, wherein the bulk material is amorphous and remains amorphous with shear. A chewing gum, comprising: a) a gum base; b) a flavor; and c) a bulk material contains at least 40 wt. % dry basis sorbitol, at least 7 wt. % dry basis polyol other than sorbitol and no more than 10 wt. % water.

20 Claims, No Drawings

AMORPHOUS CHEWING GUM BULK MATERIAL

CROSS-REFERENCE TO RELATED APPLICATION

This application is a U.S. National Phase patent application of International Application Serial Number PCT/US2011/026662 filed on Mar. 1, 2011, which claims benefit to U.S. Provisional Application No. 61/309,237 filed Mar. 1, 2010, both of which are incorporated by reference herein.

BACKGROUND OF THE INVENTION

This invention relates to amorphous bulk materials useful in chewing gum and more particularly relates to low water content amorphous polyol bulk material and chewing gum incorporating such bulk materials.

Typically, chewing gum contains a water-insoluble gum base component usually containing an elastomer and an inorganic filler such as calcium carbonate, a water-soluble bulk material or "bulking agent" component, and minor components such as flavors, colors, and sensates. The conventional bulking agent is sugar (sucrose) which provides bulk and appropriate sweetness to a chewing gum composition. "Sugar-free" gum compositions typically replace sucrose with a polyol as a bulking agent. Because polyols are not as sweet as sugar, such "sugar-free" gums also contain high intensity sweeteners such as aspartame or sucralose.

Consumers prefer a chewing gum that has a firm, but not too hard, chewing character from the first bite though the final chew. They also want the same chew texture character whenever they use the product. Because traditionally chewing gum is 20-80% bulk sweetener, the bulking agent physical form influences the chewing gum texture.

Typical sugar-free chewing gum products contain bulking agents that are in a crystalline powder form. Traditionally, sugars are hydrogenated into polyol solutions, which then are crystallized and purified into crystalline bulk powders, usually contain only a single polyol. The crystalline polyol powder then is mixed with the gum base and other ingredients, such as softeners, flavors, colors and sensates. Addition of crystalline polyol powder to chewing gum requires a handling system with dust control together with bulk dry storage and transport systems.

During mixing, powder material aids in breaking up the chewing gum base mass, allowing intermixing with the other chewing gum components. Too much bulk material, when on powder form, can lead to brittle, non-elastic chewing gum mass. Too little bulk material powered can lead to sticky, deformable chewing gum mass. Additionally, the size of the powder crystal also may affect the texture of the chewing gum. Finer crystal powder is traditionally used so as to not give a brittle and/or gritty texture. Moisture can initiate crystal growth, creating a change in the chewing gum texture during storage.

The bulk material (sometimes referred to as the "bulking agent") gives mass to a chewing gum and modifies the chew of the gum base. Bulk material often gives sweetness to the chewing gum, although sweetness often is boosted by addition of high intensity sweeteners. The bulk material also carries flavors and other minor soluble ingredients into the saliva as the chewing gum is chewed. The bulk material affects the texture of the chewing gum during processing (such as sheeting), during chewing (such as with the first bite), and during storage (controlled texture through controlled physical structure). The most common bulk material for sugar-free chewing gum is sorbitol, due to its lower cost than other other polyols, such as maltitol or xylitol. Other polyols include mannitol. As cost is among key criteria in choosing sorbitol, there is a need for a less expensive version of sorbitol for use as a bulk material for sugar-free chewing gum.

Aqueous sorbitol solution has been added as a partial replacement for bulk crystalline sorbitol powder. Use of sorbitol solutions may be less expensive than sorbitol powder, because such process does not include a crystallization step. Limits to sorbitol solution addition for this purpose have been due to the amount of water in the sorbitol solution, due to the need for a means of getting the sorbitol to crystallize out of solution so that the sorbitol can function as the bulk ingredient. The amount of sorbitol solution addition is limited by the water in the solution. A higher concentrated aqueous sorbitol solution delivers a higher ratio of sorbitol to water. This supersaturated solution will crystallize in the chewing gum mass upon high shear mixing and/or crystal seeding. Anticrysallizing agents, such as glycerin, are added to the supersaturated solution to keep the sorbitol from crystallizing before mixing.

Traditionally, glycerin and/or sorbitol aqueous solution are added to chewing gum for the purpose of softening chewing gum and to aid in intermixing of ingredients. Useful amounts of sorbitol aqueous solution (typically 30 wt % water and 70 wt % sorbitol) and glycerin as softening agents are limited. With sorbitol solution, too much solution addition will add too much water to the product, causing the gum to be too soft to sheet, causing the gum to have too soft a first bite, and causing detrimental physical and chemical changes during storage. If the sorbitol solution has too high a sorbitol concentration, the sorbitol will crystallize out of solution before incorporation into the gum composition, causing significant difficulties in solution processing, storage, and transport, and in addition to the chewing gum. Certain high concentrations of sorbitol (e.g., 45-65 wt. %) are possible in solution, with the addition of other polyols (e.g., 1-24 wt. % maltitol and/or mannitol), and/or glycerin (e.g., 13-45) to keep the sorbitol from crystallizing out of solution until it is mixed into the chewing gum batch. In these circumstances, sufficient shear is then applied to the chewing gum mass during mixing to crystallize the sorbitol out of solution. Moisture, which is then released from the solution as the sorbitol crystallizes, softens the gum. The glycerin and other polyols then become softening additives in the chewing gum.

With glycerin, too much glycerin addition will cause chewing gum to be too soft to sheet and will create easily deformable pieces, which will be difficult to pan coat. Too much glycerin also creates a too soft first bite and general chew texture. Too much glycerin will cause more incorporation of water from saliva into the chewing gum mass as the chewing gum is chewed, creating a general impression of a softer chew. Glycerin is a strong humectant and can cause chewing gum to pick-up moisture during storage, causing detrimental changes during storage. Glycerin is a strong enough humectant that it will pull moisture through an applied pan coating and into the gum center. The moisture can then soften both the gum and the pan coating.

When glycerin is added to chewing gums with traditional crystalline bulk material powders, especially sorbitol, part of the glycerin is pulled or absorbed into pockets of the crystalline powder and part of the glycerin is free to combine with all of the chewing gum ingredients during mixing. Only the free glycerin is available to soften the chewing gum mass, until the pockets of crystalline bulk agent are solubilized during mastication, and then the full glycerin is available for softening. This creates difficulties in determining amount of glycerin addition for the entire life of the chewing gum, that is, from processing through consumption. With glycerin, too much addition into chewing gum will cause the chewing gum to pick-up moisture during storage, causing detrimental changes during storage. This includes glycerin absorbed and free. Glycerin is a humectant. Glycerin is a strong enough humectant that it will pull moisture through an applied pan coating and into the gum center. Also, being a fluid softening material, too much glycerin will lead to deformities during sheeting and/or pellet coating as the gum mass will be too soft and malleable. Too much glycerin also creates a too soft bite and also causes softer general chew as it causes more incorporation of water from saliva into the chewing gum mass as the product is chewed.

Besides softening the gum mass, some fluid material is necessary in chewing gum formulas to aid in intermixing the various formula ingredients, such as gum base, bulk material, and minor ingredients, such as flavors, sensates, high intensity sweeteners and colors. Fluid material also aids in breaking up lumps of dry ingredients and distributes minor ingredients throughout the chewing gum mass.

A fluid material is flowable, that is, it will flow down an inclined plane at a specific temperature. For chewing gum, a fluid material would preferably flow down an inclined plane at gum mixing or sheeting temperatures, which are typically 40-110 C. Traditionally, glycerin and sorbitol aqueous solution are the fluid materials of choice, though other fluid materials have been explored.

Addition of molten polyols to chewing gum has not been found to be practical. Though fluid upon melting, most polyols (for example xylitol) quickly transition to solid crystalline form as they cool. Though molten sorbitol does not crystallize as quickly as other polyols, it does form a hard solid, which then will crystallize upon mixing shear and/or upon seeding. This physical transformation is again useful for hard crystalline coatings, but no useful as a replacement for tradition gum softeners.

There is a need to use an alternative form of bulk material in chewing gum, such that the alternative form of bulk material will perform the bulking requirements of a bulk material in chewing gum, with the advantages of being less expensive than the use of traditional crystalline polyol powder, and yet create a finished chewing gum texture softness without need of sorbitol solution or glycerin. Additionally, if the alternative form of bulk material is fluid, other detrimental characteristics of crystalline polyol powder can be eliminated, such as plant dust filtration equipment.

SUMMARY OF THE INVENTION

A bulk material suitable for use in a chewing gum contains at least about 40 wt. % dry basis sorbitol, at least about 7 wt. % dry basis other than sorbitol, and no more than about 10 wt. % water, wherein the bulk material is amorphous and remains amorphous with shear. A chewing gum, comprising: a) a gum base; b) a flavor; and c) a bulk material contains at least 40 wt. % dry basis sorbitol, at least 7 wt. % dry basis polyol other than sorbitol and no more than 10 wt. % water.

DESCRIPTION OF THE INVENTION

The present invention is directed to a bulk material that has a high polyol content, low water content and is amorphous, which, which mixed with other chewing gum materials in a fluid state, creates a chewing gum product with a stable texture that meets the requirements for producing a chewing gum which sheets acceptably and has the first bite and general chew characteristics preferred by consumers.

The high polyol content, low water content, amorphous bulk material remains is an amorphous state in the chewing gum and does not significantly crystallize, even after application of sheer during mixing and when crystalline polyol material is present.

The high polyol content, low water content, amorphous bulk material of this invention provides a sweetening mass to a chewing gum, while having a physical texture that will compliment the chew texture of the gum base. The amorphous bulk material of this invention carries flavors and other soluble ingredients into the saliva as the chewing gum is chewed. Moisture addition to the gum is limited, as is glycerin addition. Unlike dry, crystalline polyol powder, the amorphous bulk material of this invention keeps a consistent texture during processing, sheeting, tempering and storage, as it maintains an amorphous physical form.

In an aspect of this invention, a low water containing bulk material is formed containing a primary polyol such as sorbitol and at least on other polyol, which is suitable for use as a bulk material in chewing gum. In a further aspect of this invention, maltitol may be used as the primary polyol instead of sorbitol. Typically, a bulk material contains at least about 40 wt. % dry basis of the primary polyol. A typical bulk material contains at least about 60 wt. % basis primary polyol.

Typically, the amorphous bulk materials is this invention have a low water content. Typically, the water content is no more than about 20 wt. %, more typically no more than about 15 wt. %, 10 wt. %, or 6 wt. %. A typical bulk material of this invention contains no more than about 6 wt. %, or typically no more than about 6 wt. %.

Irrespective of whether sorbitol or maltitol is the primary polyol in the bulk material, at least about 7 wt. % dry basis, at least about 10 wt. % dry basis, or at least 15 wt. % dry basis of another polyol is combined with the primary polyol as part of the bulk material. Thus, a bulk material may contain at least about 60 wt. % dry basis sorbitol and at least about 15 wt. % dry basis maltitol; at least about 70 wt. % dry basis sorbitol and at least about 5 wt. % dry basis maltitol; at least about 60 wt. % dry basis maltitol and at least about 15 wt. % dry basis sorbitol; and at least about 70 wt. % dry basis maltitol and at least about 5 wt. % dry basis sorbitol. Other polyols also may be included in the bulk material.

Polyol containing bulk materials of this invention are amorphous and remain amorphous under sheer conditions. Sheer conditions include sheer normally experienced by a mass during mixing of chewing gum components.

Polyol containing bulk materials of this invention typically may be prepared by evaporation of water from aqueous of polyol mixtures. A preferable method is to evaporate water from an aqueous polyol solution under reduced pressure.

Typically, a chewing gum composition is formed by mixing a gum base with at least one bulk material of this invention. Typically, an amorphous polyol-containing bulk material is mixed into a suitable gum base at a temperature above the glass transition temperature of the bulk material in a temperature region in which the bulk material is in a fluid or viscous liquid state. Such bulk material will remain amorphous (i.e., will not transform into crystalline material) during or after mixing with sheer. After cooling below the glass transition temperature of the bulk material, a chewing gum formed with the bulk material will remain amorphous.

An bulk material may be characterized by thermal properties such as those measured using differential scanning calorimetry (DSC). A thermogram of an bulk material obtained by DSC will exhibit a glass transition i.e., a transformation of an bulk material between hard/brittle substance and flowable/flexible substance as the substance is heated. This transformation typically occurs over a wide temperature range with the mid-point of such range typically referred to as the glass transition temperature (Tg). Upon further heating of such an amorphous substance, the substance may transform from a flowable, plastic phase into a free-flowing liquid. A DSC of a crystalline material will not show a glass transition, but typically will show a distinct, sharp melting temperature. Other methods of distinguishing amorphous from crystalline substances include x-ray diffraction in which an bulk material will not show distinct diffraction peaks.

Refractometry is a method of measuring the refractive index of a substance (a fundamental physical property) in order to assess composition. A refractometer is the instrument used to measure refractive index (RI). RI of a substance is a function of the wavelength of light used and temperature. RI measurements usually are reported at a reference temperature of 20° C. (though sometimes 60° C. is used) and a reference wavelength of 589.3 nm often is used. RI can be used to measure percent solids content of a substance containing multiple materials.

Amorphous Bulk Material and Method of Manufacture

The present invention is directed to a bulk material suitable for use in chewing gum, which contains at least about 40 wt. % dry basis sorbitol, at least about 7 wt. % dry basis of a polyol other than sorbitol, and no more than about 10 wt. % water, wherein the bulk material is amorphous and remains amorphous under gum mixing sheer. The present invention is also directed to a chewing gum comprising a gum base, a flavor, and the amorphous bulk material.

The amorphous bulk material of this invention contains a high polyol content, a low water content, and is produced by a method, which creates an bulk material with a characteristic refractive index (RI) of 1.3-1.8 at 20° C., when the bulk sweetener is less than 6 wt. % water. The amorphous bulk material is produced by a method, which creates a fluid material at chewing gum processing temperatures, i.e., from 40-140° C.

An aspect of this invention is a high polyol content low water content, amorphous bulk material, which comprises about 40-85 wt. % dry basis sorbitol, about 5-20 wt. % dry basis maltitol, about 0-8 wt. % dry basis mannitol, about 0-2 wt. % dry basis glycerin, and about 1-6 wt. % dry water. The high polyol content, low water content, amorphous bulk material is produced by heating, with or without vacuum, an aqueous solution containing about 40-85 wt. % dry basis sorbitol until the final solution is about 1-6 wt. % water content.

An aspect of this invention is a bulk material comprising about 90-99 wt. % dry basis, which has refractive index (RI) of 1.3-1.8 at 20° C. Another aspect of this invention is a bulk material comprising about 90-99 wt. % dry basis solids, which has a Tg of 30-80° C. Another aspect of this invention is a bulk material comprising about 90-98 wt. % dry basis solids, which has a Tg of 30-80° C. and has a refractive index of 1.3-1.8 at 20° C.

An aspect of this invention is a bulk material comprising not less than about 80 wt. % dry basis solids, which has a refractive index (RI) of 1.3-1.8 at 20° C.

Another aspect of this invention is a bulk material comprising at least about 80 wt. % solids, which has a Tg of 30-80° C. Another aspect of this invention is a polyol bulk ingredient comprising 80-99 wt. % dry solids, which has a Tg of 30-80° C. and has a refractive index of 1.3-1.8 at 20° C. and RI.

An aspect of this invention is a bulk material comprising not less than about 40 wt. % dry basis sorbitol, about 5-20 wt. % dry basis maltitol, about 0-8 wt. % dry basis mannitol, about 0-2 wt. % dry basis glycerin and about 1-10 wt. % water, which will not crystallize in less than about 10 hours when stored at not less than 70° C. Another aspect of this invention is a polyol bulk ingredient comprising not less than about 40 wt. % dry basis sorbitol, about 5-20 wt. % dry basis maltitol, about 0-8 wt. % dry basis mannitol, about about 0-2 wt. % dry basis glycerin, and about 1-10 wt. % water, which will not crystallize in less than 10 hours when stored at not less than 70° C. An aspect of this invention is a polyol bulk ingredient comprising not less than about 65 wt. % dry basis sorbitol, about 5-20 wt. % dry basis maltitol, about about 0-10 wt. % dry basis mannitol, about 0-2 wt. % dry basis glycerin, and about 1-10 wt. % water, which will not crystallize in less than 10 hours at not less than 80° C. An aspect of this invention is a polyol bulk ingredient comprising not less than about 65 wt. % dry basis sorbitol, about 0-20% dry basis maltitol, about 0-10 wt. % dry basis mannitol, about 0-2 wt. % dry basis glycerin, and about 1-10 wt. % water, which will not crystallize in less than 24 hours at not less than 70° C.

An aspect of this invention is a bulk material comprising about 65-85 wt. % dry basis sorbitol, about 5-15 wt. % dry basis maltitol, about 0-8 wt. % dry basis mannitol, about 0-2 wt. % dry basis glycerin and about 1-6 wt. % water, which is flowable down a 45 degree inclined plane at at not less than 70° C. Another aspect of this invention is a bulk material about 65-85 wt. % dry basis sorbitol, about 5-15 wt. % dry basis maltitol, about 0-8 wt. % dry basis mannitol, about 0-2 wt. % dry basis glycerin, and about 1-10 wt. % water, which is flow able down a 70 degree inclined plate at not less than 80° C. An aspect of this invention is a bulk material comprising about 65-85 wt. % dry basis sorbitol, about 5-15 wt. % dry basis maltitol, about 0-8 wt. % dry basis mannitol, about 0-2 wt. % dry basis glycerin, and about 1-6 wt. % moisture, which is flowable down an 70 degree inclined plane at not less than 70° C.

An aspect of this invention is a bulk material comprising about 40-99 wt. % dry basis sorbitol, about 5-20 wt. % dry basis maltitol, about 0-6 wt. % dry basis mannitol, about 0-8 wt. % dry basis glycerin and about 1-10 wt. % water, which has a refractive index (RI) of 1.3-1.8 at 20° C. Another aspect of this invention is a bulk material comprising about 40-99 wt. % dry basis sorbitol, about 5-20 wt. % dry basis maltitol, about 0-8 wt. % dry basis mannitol, about 0-2 wt. % dry basis glycerin, and about 1-10 wt. % water, which has a Tg of 30-80° C. An aspect of this invention is a bulk material comprising about 40-99 wt. % dry basis sorbitol, about 5-20 wt. % dry basis maltitol, about 0-8 wt. % dry basis mannitol, about 0-2 wt. % glycerin, and about 1-10 wt. % water, which has a refractive index (RI) of 1.3-1.8 at 20° C. and has a Tg of 30-80° C.

An aspect of this invention is a bulk material comprising about 65-85 wt. % dry basis sorbitol, about 5-15 wt. % dry basis maltitol, and about 2-8 wt. % dry basis mannitol, which has a refractive index (RI) of 1.3-1.8 at 20° C. Another aspect of this invention is a bulk material comprising not less than about 65-85 wt. % dry basis sorbitol, about 5-15 wt. % dry basis maltitol, and about 2-8 wt. % dry basis mannitol, which has a Tg of 30-80° C. An aspect of this invention is a bulk material comprising not less than about 65-85 wt. % dry basis sorbitol, about 5-15 wt. % dry basis maltitol, and about 2-8 wt. % dry basis mannitol, which has a refractive index (RI) of 1.3-1.8 at 20° C. and has a Tg of 30-80° C.

An aspect of this invention is a bulk material comprising about 65-85 wt. % dry basis sorbitol, about 5-15 wt. % dry basis maltitol, and about 2-8 wt. % dry basis mannitol, which has a refractive index (RI) of 1.3-1.8 at 20° C. and has a viscosity of 30,000 cps-50,000 at 130° F. as measured by Brookfield viscometer. Another aspect of this invention is a bulk material comprising not less than about 65-85 wt. % dry basis sorbitol, about 5-15 wt. % dry basis maltitol, and about 2-8 wt. % dry basis mannitol, which has a Tg of 30-80° C. and has a viscosity of 30,000 cps-50,000 at 130° F. as measured by Brookfield viscometer. An aspect of this invention is a bulk material comprising not less than about 65-85 wt. % dry basis sorbitol, about 5-15 wt. % dry basis maltitol, and about 2-8 wt. % dry basis mannitol, which has a refractive index (RI) of 1.3-1.8 at 20° C. and has a Tg of 30-80° C. and has a viscosity of 30,000 cps-50,000 at 130° F. as measured by Brookfield viscometer.

An aspect of this invention is a bulk material comprising about 65-85 wt. % dry basis sorbitol, about 5-15 wt. % dry basis maltitol, and about 2-8 wt. % dry basis mannitol, which has a refractive index (RI) of 1.3-1.8 at 20° C. and has a viscosity of 10,000 cps-15,000 at 140° F. as measured by Brookfield viscometer. Another aspect of this invention is a bulk material comprising not less than about 65-85 wt. % dry basis sorbitol, about 5-15 wt. % dry basis maltitol, and about 2-8 wt. % dry basis mannitol, which has a Tg of 30-80° C. and has a viscosity of 10,000 cps-15,000 at 140° F. as measured by Brookfield viscometer. An aspect of this invention is a bulk material comprising not less than about 65-85 wt. % dry basis sorbitol, about 5-15 wt. % dry basis maltitol, and about 2-8 wt. % dry basis mannitol, which has a refractive index (RI) of 1.3-1.8 at 20° C. and has a Tg of 30-80° C. and has a viscosity of 10,000 cps-15,000 at 140° F. as measured by Brookfield viscometer.

An aspect of this invention is a bulk material comprising not less than about 65-85 wt. % dry basis maltitol, about 5-15 wt. % dry basis sorbitol, about 0-8 wt. % dry basis mannitol, about 0-6 wt. % dry basis glycerin, and about 1-10 wt. % water, which has a Tg of 30-80° C. and is amorphous.

An aspect of this invention is a bulk material comprising not less than about 65-85 wt. % dry basis maltitol, about 5-15 wt. % dry basis sorbitol, about 0-8 wt. % dry basis mannitol, not more than 0.5 wt. % dry basis glycerin, and not more than 6 wt. % water, which has a refractive index (RI) of 1.3-1.8 at 20° C. and is amorphous.

An aspect of this invention is a bulk material comprising about 65-85 wt. % dry basis maltitol, about 5-15 wt. % dry basis maltitol, about 2-8 wt. % dry basis mannitol, not more than 0.5 wt. % dry basis glycerin, and not more than 6 wt. % water, which has a refractive index (RI) of 1.3-1.8 at 20° C. and has a Tg of 30-80° C.

An aspect of this invention is a bulk material comprising about 65-85 wt. % dry basis sorbitol, about 5-15 wt. % dry basis maltitol, about 2-8 wt. % dry basis mannitol, not greater than 0.5 wt. % dry basis glycerin, and not greater 6 wt. % water, which has a refractive index (RI) of 1.3-1.8 at 20° C. and has a Tg of 30-80° C., which does not crystallize when dropped to 35-65° C. from 75-90° C.

An aspect of this invention is a method of producing a bulk material comprising about 90-99 wt. % dry solids, which has a refractive index (RI) of 1.3-1.8 at 20° C., comprising the step of evaporating a polyol material comprising of not less than about 60 wt. % dry solids. Another aspect of this invention is a method of making a bulk material comprising 90-99 wt. % dry solids, which has a Tg of 50-60° C., comprising the step of evaporating a polyol material comprising of not less than about 60 wt. % dry solids. Another aspect of this invention is method of making a bulk material comprising 96-99 wt. % dry solids, which has a Tg of 50-60° C. and has a refractive index of 1.3-1.8 at 20° C., comprising the step of evaporating a polyol material comprising of not less than about 60 wt. % dry solids.

An aspect of this invention is a method of producing a bulk material with a Tg of 30-80° C. by evaporating a polyol material comprising of not less than about 60 wt. % dry solids to not less than about 90 wt. % dry basis solids, and then dropping the evaporated bulk material temperature from about 75-90° C. to about 35-65° C. without crystallization of the polyols, An aspect of this invention is a method of producing a bulk material containing not less than 90 wt. % dry basis solids comprising the step of evaporating a polyol material comprising of not less than about 60 wt. % dry solids and then dropping the evaporated bulk material temperature from about 75-90° C. to about 35-65° C. without crystallization of the polyols.

An aspect of this invention is a method of producing a bulk material comprising not less than 40 wt. % dry basis sorbitol, about 5-20 wt. % dry basis maltitol, about 0-8 wt. % dry basis mannitol, about 0-2 wt. % dry basis glycerin, and 1-10 wt. % water, which will not crystallize in less than 24 hours at not less than 70° C., such method comprising the step of evaporating a polyol material comprising of not less than about 60 wt % solids.

An aspect of this invention is a method of producing a bulk material comprising about 65-85 wt. % dry basis sorbitol, about 5-15 wt. % dry basis maltitol, about 0-8 wt. % dry basis mannitol, not more than 0.5 wt. % dry basis glycerin, and not more than 6 wt. % water, which is flowable down a 70 degree inclined plane at not less than 70° C., such method comprising the step of evaporating a polyol material comprising not less than about 60 wt % dry solids and then dropping the evaporated syrup temperature from about 75-90° C. to about 35-65° C. without crystallization of the sorbitol.

An aspect of this invention is a method of producing a bulk material comprising not less than 65 wt. % dry basis sorbitol, not more than 20 wt. % dry basis maltitol, not more than 8 wt. % dry basis mannitol, not more than 0.5 wt. % dry basis glycerin, and not more than 6 wt. % water, which has a Tg of 30-80° C., such method comprising the step of evaporating a polyol material comprising not less than about 60 wt % dry solids.

An aspect of this invention is a method of producing a bulk material comprising about 40-85 wt. % dry basis sorbitol, about 5-20 wt. % dry basis maltitol, about 0-8 wt. % dry basis mannitol, about 0-2 wt. % dry basis glycerin, and about 1-10 wt. % water, which has a refractive index (RI) of 1.3-1.8 at 20° C., such method comprising the step of evaporating a polyol material comprising not less than about 60 wt % dry solids.

An aspect of this invention is a method of producing a bulk material comprising about 40-85 wt. % dry basis sorbitol, about 5-20 wt. % dry basis maltitol, about 0-8 wt. % dry basis mannitol, about 0-2 wt. % dry basis glycerin, and about 1-10 wt. % water, which has a refractive index (RI) of 1.3-1.8 at 20° C. and has a Tg of 30-80° C., such method comprising the steps of evaporating a polyol material comprising not less than about 60 wt % dry solids, and the dropping the evaporated polyol material temperature from about 75-90° C. to about 35-65° C. without crystallization of sorbitol.

An aspect of this invention is a method of making a bulk material comprising not less than about 65-85 wt. % dry basis maltitol, about 5-15 wt. % dry basis sorbitol, about 2-8 wt. % dry basis mannitol, about 0-2 wt. % dry basis glycerin, and about 1-6 wt. % water, which has a refractive index (RI) of 1.3-1.8 at 20° C., such method comprising the step of evaporating a polyol material comprising not less than about 60 wt % dry solids, and the dropping the evaporated polyol material temperature from about 75-90° C. to about 35-65° C. without crystallization of maltitol.

An aspect of this invention is a method of producing a bulk material comprising about 40-99 wt. % dry basis sorbitol, about 0-20 wt. % dry basis maltitol, about 0-8 wt. % dry basis mannitol, about 0-2 wt. % dry basis glycerin, and about 1-10 wt. % water, which has a refractive index (RI) of 1.3-1.8 at 20° C. and has a Tg of 30-80° C., such method comprising the step of evaporating a polyol material comprising not less than about 60 wt % solids and then dropping the evaporated polyol material temperature from about 75-90° C. to about 35-65° C. without crystallization of the sorbitol.

An aspect of this invention is a method of producing a bulk material comprising about 40-85 wt. % dry basis sorbitol, about 5-15 wt. % dry basis maltitol, about 2-7 wt. % dry basis mannitol, not greater than 0.5 wt. % dry basis glycerin, and not greater 6 wt. % water, which has a refractive index (RI) of 1.3-1.8 at 20° C. and has a Tg of 30-80° C., such method comprising the step of evaporating a polyol material comprising not less than about 60 wt % solids and then dropping the evaporated polyol material temperature from about 75-90° C. to about 35-65° C. without crystallization of the sorbitol.

The following examples illustrate, but do not limit, this invention.

Example 1

An example of a high polyol content, low water content, amorphous fluid polyol bulk sweetener material of this invention, which comprised 69.5 wt % sorbitol, 14.1 wt % maltitol, 3.5 wt % mannitol, 0.7 wt. % glycerin, and 2.7 wt % water, was produced by evaporating to an original solution containing 51.3 wt % sorbitol, 10.3 wt % maltitol, 2.9 wt % mannitol, 0.5 wt % glycerin, and 28.0 wt % water (Roquette Neosorb 70/708) solution at a temperature of 157° C. (310° F.) at atmospheric pressure (i.e. no vacuum). The resulting fluid bulk sweetener had a refractive index (RI) of 1.526 @ 20° C., taken at 45° C. during evaporation. The Differential Scanning calorimetry (DSC) profile indicated a broad transition temperature ranging from 50-60° C.

Example 2

Two commercially available 70% solids solutions (Roquette Neosorb 70/70 and Corn Products Sorbo A-625 NCS) were concentrated to about 96 wt. % solids for delivery at 140° F. using Plate Heat Exchanger Evaporator over a three day trial using different vacuum levels and temperatures. The two sources acted similarly. The result was that the heat transfer coefficients were lower than expected at 50-75 BTU/lbm-F/ft$^2$. Also, vacuum under 20" Hg brought the product temperature down to 240° F. vs. 305° F. under atmospheric conditions (of earlier trials) while maintaining a reasonable evaporation rate. Running at a high vacuum of 26" Hg brought the temperature down further to 210° F. but with lower evaporation rate. The product viscosity remained low enough to re-circulate using a positive displacement pump, 11,000 cp at 140° F. and 40,000 cp at 120° F. Even at 99 wt. % dry solids, the final product flowed readily at 140° F. (after the tube and tube cooler). Product was held at 96% DS, at 180° F. for 24 hours. With sampling every four hours, no color development was evident. Due to expected higher viscosities, a tube-in-tube heat exchanger was used to cool the product from the evaporator. Due to the laminar flow conditions of the hot, evaporated product, a Plate and Frame cooler was thought to be a better fit for cooling. Viscosities were measured by Brookfield viscometer. Viscosity of product at 97 wt. % solids was below 1000 cp about 200° F. and rises significantly as temperature decreases, to 11,000 cp @ 140° F. and 40,000 cp @ 130° F. Sorbo A-625 NF had a pre-evaporation content of: about 49 wt % sorbitol; 8 wt % maltitol; 1 wt % mannitol; 4 wt % glycerin; and 28 wt % water. NeoSorb 70/70 B had a pre-evaporation content of: about 51 wt % sorbitol; 10 wt % maltitol; 3 wt % mannitol; 0.5 wt. % glycerin; and 28 wt. % water. The pre-evaporation/post-evaporation Refractive Index (RI) of the Sorbo A-625 NF sample was 1.463/1.525. The pre-evaporation Refractive Index (RI) of the Neosorb 70/70 B was 1.459/1.515.

Chewing Gum Containing Bulking Material and Process of Producing

An aspect of this invention is a chewing gum, comprising a gum base and a bulk material comprising about 90-98 wt. % dry basis solids, which has a refractive index (RI) of 1.3-1.8 at 20 C. Another aspect of this invention is a chewing gum, comprising a gum base and a bulk material comprising 90-98 wt. % solids, which has a Tg of 30-80 C. Another aspect of this invention is a chewing gum, comprising a gum base and a bulk material comprising 90-98 wt. % dry solids, which has a Tg of 30-80 C and has a refractive index of 1.3-1.8 at 20 C and is amorphous.

An aspect of this invention is a chewing gum, comprising a gum base and a bulk material comprising about 90-99 wt. % dry basis solids that has a refractive index (RI) of 1.3-1.8. Another aspect of this invention is a chewing gum, comprising a gum base and a bulk material comprising not less than 90-99 wt. % solids that has a Tg of 30-80° C. Another aspect of this invention is a chewing gum, comprising a gum base and a bulk material comprising about 90-99 wt. % solids, which has a Tg of 30-80° C. and has a refractive index of 1.3-1.8 at ° C.

An aspect of this invention is a chewing gum, comprising a gum base and a bulk material comprising not less than about 40-85 wt. % dry basis sorbitol, about 5-15 wt. % dry basis maltitol, about 0-8 wt. % dry basis mannitol, about 0-2 wt. % dry solids glycerin and about 1-10 wt. % water, which will not crystallize in less than about 10 hours when stored at not less than 70 C. Another aspect of this invention is a a chewing gum, comprising a gum base and a bulk material comprising about 40-85 wt. % dry basis sorbitol, about 5-15 wt. % dry basis maltitol, about 0-8 wt. % dry basis mannitol, about 0-2 wt. % dry solids glycerin, and about 1-10 wt. % water, which will not crystallize in less than 6 hours when stored at not less than 40° C. An aspect of this invention is a chewing gum, comprising a gum base and a bulk material comprising about 40-85 wt. % dry basis sorbitol, about 5-15 wt. % dry basis maltitol, about 0-8 wt. % dry basis mannitol, about 0-2 wt. % dry basis glycerin, and about 0-20 wt. % water, which will not crystallize in less than 24 hours at not less than 70 C. An aspect of this invention is a chewing gum, comprising a gum base and a bulk material comprising about 40-85 wt. % dry basis sorbitol, about 5-15 wt. % dry basis maltitol, about 0-8 wt. % dry basis mannitol, about 0-2 wt. % dry basis glycerin, and about 1-10 wt. % water, which will not crystallize in less than 10 hours at not less than 60 C.

An aspect of this invention is a chewing gum, comprising a gum base and a bulk material comprising about 40-85 wt. % dry basis sorbitol, about 5-15 wt. % dry basis maltitol, about 0-8 wt. % dry basis mannitol, about 0-2 wt. % dry basis glycerin and about 1-10 wt. % water, which is flowable down a 45 degree inclined plane at at not less than 70° C. Another aspect of this invention is a chewing gum, comprising a gum base and a bulk material comprising about 40-85 wt. % dry basis sorbitol, about 5-15 wt. % dry basis maltitol, about 0-8 wt. % dry basis mannitol, about 0-wt. % dry basis glycerin, and about 1-10 wt. % water, which is flow able down a 70 degree inclined plane at not less than 70° C. An aspect of this invention is a chewing gum, comprising a gum base and a bulk material comprising about 40-85 wt. % dry basis sorbitol, about 5-15 wt. % dry basis maltitol, about 0-8 wt. % dry basis mannitol, about 0-2 wt. % dry basis glycerin, and about 1-10 wt. % water, which is flow able down an 70 degree inclined plane at not less than 80° C.

An aspect of this invention is a chewing gum, comprising a gum base and a bulk material comprising about 40-99 wt. % dry basis sorbitol, about 0-20 wt. % dry basis maltitol, about 0-8 wt. % dry basis mannitol, about 0-6 wt. % dry basis glycerin and about 1-10 wt. % water, which has a refractive index (RI) of 1.3-1.8. Another aspect of this invention is a chewing gum, comprising a gum base and a bulk material comprising about 40-99 wt. % dry basis sorbitol, about 0-20 wt. % dry basis maltitol, about 0-8 wt. % dry basis mannitol, about 0-2 wt. % dry basis glycerin, and about 1-10 wt. % water, which has a Tg of 30-80° C. An aspect of this invention is a chewing gum, comprising a gum base and a bulk material comprising about 40-99 wt. % dry basis sorbitol, about 0-20 wt. % dry basis maltitol, about 0-8 wt. % dry basis mannitol, about 0-2 wt. % dry basis glycerin, and about 1-10 wt. % water, which has a refractive index (RI) of 1.3-1.8 at 20° C. and has a Tg of 30-80° C. and is amorphous.

An aspect of this invention is a chewing gum, comprising a gum base and a bulk material comprising about 65-85 wt. % dry basis sorbitol, about 5-15 wt. % dry basis maltitol, and about 0-8 wt. % dry basis mannitol, which has a refractive index (RI) of 1.3-1.8 at 20° C. Another aspect of this invention is a chewing gum, comprising a gum base and a bulk material comprising not less than about 65-85 wt. % dry basis sorbitol, about 5-15 wt. % dry basis maltitol, and about 0-8 wt. % dry basis mannitol, which has a Tg of 30-80° C. An aspect of this invention is a chewing gum, comprising a gum base and a bulk material comprising about 65-85 wt. % dry basis sorbitol, about 5-15 wt. % dry basis maltitol, and about 0-8 wt. % dry basis mannitol, which has a refractive index (RI) of 1.3-1.8 at 20° C. and has a Tg of 30-80° C.

An aspect of this invention is a chewing gum, comprising a gum base and a bulk material comprising about 65-85 wt. % dry basis maltitol, about 5-15 wt. % dry basis sorbitol, about 0-8 wt. % dry basis mannitol, about 0-2 wt. % dry basis glycerin, and 1-10 wt. % water, which has a refractive index (RI) of 1.4-1.6 at 20° C. Another aspect of this invention is a chewing gum, comprising a gum base and a bulk material comprising about 65-85 wt. % dry basis maltitol, about 5-15 wt. % dry basis sorbitol, about 0-8 wt. % dry basis mannitol, about 0-2 wt. % dry basis glycerin, and about 1-10 wt. % water, which has a Tg of 30-80° C. An aspect of this invention is a chewing gum, comprising a gum base and a bulk material comprising about 65-85 wt. % dry basis maltitol, about 5-15 wt. % dry basis sorbitol, about 0-8 wt. % dry basis mannitol, about 0-2 wt. % dry basis glycerin, and about 1-10 wt. % water, which has a refractive index (RI) of 1.3-1.8 at 20° C. and has a Tg of 30-80° C.

An aspect of this invention is a chewing gum, comprising a gum base and a bulk material comprising about 40-99 wt. % dry basis maltitol, about 0-20 wt. % dry basis sorbitol, about 0-8 wt. % dry basis mannitol, and about 0-2 wt. % dry basis glycerin, which has a refractive index (RI) of 1.3-1.8 at 20° C. Another aspect of this invention is a chewing gum, comprising a gum base and a bulk material comprising about 40-99 wt. % dry basis maltitol, about 0-20 wt. % dry basis sorbitol, about 0-8 wt. % dry basis mannitol, about 0-2 wt. % glycerin, and about 1-10 wt. % water, which has a Tg of 30-80° C. An aspect of this invention is a chewing gum, comprising a gum base and a bulk material comprising about 40-99 wt. % dry basis maltitol, about 0-20 wt. % dry basis sorbitol, about 0-8 wt. % dry basis mannitol, about 0-2 wt. % dry basis glycerin, and 1-10 wt. % water, which has a refractive index (RI) of 1.3-1.8 at 20° C. and has a Tg of 30-80° C.

An aspect of this invention is a method of making a chewing gum, comprising a gum base and a bulk material comprising about 90-98 wt. % dry basis solids, which has a refractive index (RI) of 1.3-1.8 at 20° C., comprising the steps of evaporating a polyol material comprising of not less than about 60 wt. % dry solids, and the dropping the evaporated polyol material temperature from about 75-90° C. to about 35-65° C. without crystallization of sorbitol. Another aspect of this invention is a method of making a chewing gum, comprising a gum base and a bulk material comprising 90-98% solids, which has a Tg of 30-80° C., comprising the steps of evaporating a polyol material comprising of not less than about 60 wt. % dry solids, and the dropping the evaporated polyol material temperature from about 75-90° C. to about 35-65° C. without crystallization of sorbitol. Another aspect of this invention is a method of making a chewing gum, comprising a gum base and a bulk material comprising 90-98 wt. % dry solids, which has a Tg of 30-80° C. and has a refractive index of 1.3-1.8 at 20° C., comprising the steps of evaporating a polyol material comprising of not less than about 60 wt. % dry solids, and the dropping the evaporated polyol material temperature from about 75-90° C. to about 35-65° C. without crystallization of sorbitol.

An another aspect of this invention is a method of producing a chewing gum, comprising a gum base and a bulk material comprising not less than 80-99 wt. % solids that has a Tg of 30-80° C., such method comprising the step of mixing the gum base and the bulk material at a temperature range such that the bulk material is fluid and below its Tg.

An another aspect of this invention is a method of producing a chewing gum, comprising a gum base and a bulk material comprising not less than 80-99 wt. % solids that has a Tg of 30-80° C., such method comprising the step of mixing the gum base and the bulk material at a 30-80° C.

An aspect of this invention is a method of producing a chewing gum, comprising a gum base and a fluid amorphous bulk material comprising not less than about 65-85 wt. % dry basis sorbitol, about 5-15 wt. % dry basis maltitol, about 0-8 wt. % dry basis mannitol, about 0-2 wt. % dry basis glycerin and about 1-6 wt. % water, such method comprising the step of mixing the gum base and the bulk material at 30-80° C.

An aspect of this invention is a method of producing a chewing gum, comprising a gum base and a fluid bulk material comprising not less than about 65-85 wt. % dry basis sorbitol, about 5-15 wt. % dry basis maltitol, about 0-8 wt. % dry basis mannitol, about 0-2 wt. % dry basis glycerin and about 1-6 wt. % water, such method comprising the step of mixing the gum base and the bulk material at a temperature such that the bulk material is less than the Tg of the bulk material.

An aspect of this invention is a method of producing a chewing gum, comprising a gum base and a fluid bulk material comprising not less than about 65-85 wt. % dry basis sorbitol, about 5-15 wt. % dry basis maltitol, about 0-8 wt. % dry basis mannitol, about 0-2 wt. % dry basis glycerin and about 1-6 wt. % water, such method comprising the step of mixing the gum base and the bulk material, wherein no less than 50 wt. % dry basis of the sorbitol in the bulk material does not crystallize before 2 months of storage at 25° C.

An aspect of this invention is a method of producing a chewing gum, comprising a gum base and a fluid bulk material comprising not less than about 65-85 wt. % dry basis sorbitol, about 5-15 wt. % dry basis maltitol, about 0-8 wt. % dry basis mannitol, about 0-2 wt. % dry basis glycerin and about 1-6 wt. % water, such method comprising the step of mixing the gum base and the bulk material, wherein no more than 50 wt. % dry basis of the sorbitol in the bulk material crystallizes before 2 months of storage at 25° C.

Another aspect of this invention is a method of producing a chewing gum, comprising a gum base and a bulk material comprising about 65-85 wt. % dry basis sorbitol, about 5-15 wt. % dry basis maltitol, about 0-8 wt. % dry basis mannitol, about 0-2 wt. % dry basis glycerin, and about 1-10 wt. % water, such method comprising the steps of mixing the gum base and the bulk material at temperatures such that the bulk material is at a lower temperature than that of the gum base.

Another aspect of this invention is a method of producing a chewing gum, comprising a gum base and a bulk material comprising about 65-85 wt. % dry basis sorbitol, about 5-15 wt. % dry basis maltitol, about 0-8 wt. % dry basis mannitol, about 0-2 wt. % dry basis glycerin, and about 1-10 wt. % water that has a Tg of 30-80° C., such method comprising the step of mixing the gum base and the bulk material at 50-70° C.

Another aspect of this invention is a method of producing a chewing gum, comprising a gum base and a bulk material comprising about 65-85 wt. % dry basis sorbitol, about 5-15 wt. % dry basis maltitol, about 2-8 wt. % dry basis mannitol, not more than 0.5 wt. % dry basis glycerin, and about 1-6 wt. % water that has a Tg of 40-70° C., such method comprising the step of mixing the gum base and the bulk material at 50-70° C.

An aspect of this invention is a method of producing a chewing gum, comprising a gum base and a bulk material comprising not less than about 65-85 wt. % dry basis sorbitol, about 5-15 wt. % dry basis maltitol, about 0-8 wt. % dry basis mannitol, about 0-2 wt. % dry basis glycerin, and about 1-10 wt. % moisture, which is flow able down an 70 degree inclined plane at not less than 60 C, such method comprising the step of mixing the gum base and the bulk material at a temperature of 50-70° C.

Another aspect of this invention is a method of producing a chewing gum, comprising a gum base and a polyol bulk ingredient comprising not less than about 40-99 wt. % dry basis sorbitol, about 0-20 wt. % dry basis maltitol, about 0-6 wt. % dry basis mannitol, about 0-6 wt. % glycerin, and 0-20 wt. % water, which has a Tg of 30-80° C., such method comprising the step of mixing the gum base and the bulk material.

An aspect of this invention is a method of producing a chewing gum, comprising a gum base and a bulk material comprising not less than about 40-99 wt. % dry basis sorbitol, about 0-20 wt. % dry basis maltitol, about 0-68 wt. % dry basis mannitol, about 0-2 wt. % dry basis glycerin, and about 1-10 wt. % water, which has a refractive index (RI) of 1.3-1.8 at 20° C. and has a Tg of 30-80° C., such method comprising the step of mixing the gum base and the bulk material.

Another aspect of this invention is a method of producing a chewing gum, comprising a gum base and a polyol bulk ingredient comprising not less than about 40-99 wt. % dry basis sorbitol, about 0-20 wt. % dry basis maltitol, about 0-6 wt. % dry basis mannitol, and about 0-6 wt. % glycerin, which has a Tg of 30-80 C, such method comprising the step of mixing the gum base and the bulk material.

An aspect of this invention is a method of producing a chewing gum, comprising a gum base and a polyol bulk ingredient comprising not less than about 40-99 wt. % dry basis sorbitol, about 0-20 wt. % dry basis maltitol, about 0-8 wt. % dry basis mannitol, about 0-2 wt. % dry basis glycerin, and 1-10 wt. % water, which has a refractive index (RI) of 1.3-1.8 at 20° C. and has a Tg of 30-80° C., such method comprising the step of mixing the gum base and the bulk material at a temperature which is below the Tg of the bulk material.

An aspect of this invention is a method of producing a chewing gum, comprising a gum base and a polyol bulk ingredient comprising not less than about 65-85 wt. % dry basis sorbitol, about 5-15 wt. % dry basis maltitol, about 0-8 wt. % dry basis mannitol, not more than 0.5 wt. % dry basis glycerin, and 1-6 wt. % water, which has a Tg of 45-60° C., such method comprising the step of mixing the gum base and the bulk material at a temperature which is below the Tg of the bulk material.

An aspect of this invention is a method of producing a chewing gum, comprising a gum base and a polyol bulk ingredient comprising not less than about 65-85 wt. % dry basis sorbitol, about 5-15 wt. % dry basis maltitol, about 0-8 wt. % dry basis mannitol, not more than 0.5 wt. % dry basis glycerin, and 1-6 wt. % water, which has a refractive index (RI) of 1.5-1.6 at 20° C. and has a Tg of 45-60° C., such method comprising the step of mixing the gum base and the bulk material, wherein the gum base has a higher temperature than the bulk material at the time of mixing.

An aspect of this invention is a method of producing a chewing gum, comprising a gum base and a polyol bulk ingredient comprising not less than about 65-85 wt. % dry basis sorbitol, about 5-15 wt. % dry basis maltitol, about 0-8 wt. % dry basis mannitol, not more than 0.5 wt. % dry basis glycerin, and 1-6 wt. % water, which has a refractive index (RI) of 1.5-1.6 at 20° C. and has a Tg of 40-65° C., such method comprising the step of mixing the gum base and the bulk material at a temperature which is below the Tg of the bulk material.

An aspect of this invention is a method of producing a chewing gum, comprising a gum base and a polyol bulk ingredient comprising not less than about 65-85 wt. % dry basis sorbitol, about 5-15 wt. % dry basis maltitol, about 0-8 wt. % dry basis mannitol, not more than 0.5 wt. % dry basis glycerin, and 1-6 wt. % water, which has a refractive index (RI) of 1.5-1.6 at 20° C. and has a Tg of 45-60° C., such method comprising the step of mixing the gum base and the bulk material at a temperature which is below the Tg of the bulk material.

Another aspect of this invention is a method of producing a chewing gum, comprising a gum base and a polyol bulk ingredient comprising not less than about 40-85 wt. % dry basis sorbitol, about 0-20 wt. % dry basis maltitol, about 0-8 wt. % dry basis mannitol, and not less than 0.5 wt. % dry basis glycerin, and 1-10 wt. % water, which has a Tg of 30-80° C., such method comprising the step of mixing the gum base and the bulk material.

An aspect of this invention is a method of producing a chewing gum, comprising a gum base and a polyol bulk ingredient comprising at least about 40-85 wt. % dry basis maltitol, about 5-20 wt. % dry basis sorbitol, about 0-10 wt. % dry basis mannitol, about 0-2 wt. % glycerin, and about 1-10 wt. % water, which has a refractive index (RI) of 1.3-1.8 at 20° C. and has a Tg of 30-80° C., such method comprising the step of mixing the gum base and the bulk material at a temperature which is below the Tg of the bulk material.

An aspect of this invention is a method of producing a chewing gum, comprising the step of mixing a polyol bulk ingredient with a gum base, wherein the bulk material is at a Tg less than the temperature of the gum base.

An aspect of this invention is a method of making a chewing gum, comprising the step of combining a polyol bulk ingredient with a gum base in such a manner as the bulk material is metered into the gum base at a Tg lower than the base temperature using an apparatus which maintains polyol bulk ingredient temperate, while preventing in line crystallization.

1. Both the tab and pellet gum controls exhibited the typical sorbitol aggregates (snowballs) with typical crystal sheath structure, along with numerous fine crystals dispersed throughout the gum matrix.

2. The total amount of crystals observed in the experimental gums made with the fluid bulk sweetener was very low compared to the control gums (note: some crystalline sorbitol powder was added to the experimental gums).

3. The tab and pellet gum samples manufactured using the fluid bulk sweetener did not display the typical sorbitol aggregate structures, nor were large amounts of fine crystals observed dispersed through the gum matrix.

4. A large amount of a bright bulk material was observed in both tab and pellet gum products made using the fluid bulk sweetener.

5. The sorbitol crystals present in the experimental product made with the fluid amorphous bulk material appeared to be coated by this bulk material. This same material may be coating sorbitol aggregates prevent the observation. This bulk material is possibly the solidified form of the fluid amorphous bulk material.

Table 1 contains the formulas and process order for four chewing gum batches that were produced: a control tab chewing gum, an experimental tab chewing gum using the amorphous bulk material of this invention, a control stick chewing gum, and an experimental stick chewing gum using the amorphous bulk material of this invention. All products were evaluated and found to have acceptable first bite and full chew characteristics.

TABLE 1

Chewing Gum Formulas: Examples 3-6

| Ingredient | Order of Addition | Tab Gum Control #4 | Order of Addition | Tab Gum Exp #5 | Order of Addition | Stick Gum Control #6 | Order of Addition | Stick Gum Exp #7 |
|---|---|---|---|---|---|---|---|---|
| Gum Base | 1 | 31.1 wt % | 1 | 31.00% | 1 | 30.0 wt % | 1 | 30.0 wt % |
| Sorbitol, powder | 4 | 48.0 wt % | 2 | 10.0 wt % | 2 | 32.9 wt % | 3 | 15.0 wt % |
| Fluid Bulk Sweetener | — | — | 3 | 39.5 wt % | — | — | 2 | 44.5 wt % |
| High Intensity Sweeteners | 4 | 1.6 wt % | 7 | 1.6 wt % | 4 | 2.5 wt % | 4 | 3.0 wt % |
| Glycerin | 2 | 2.5 wt % | 4 | 2.0 wt % | 3 | 12.0 wt % | 2 | 4.3 wt % |
| Calcium Carbonate | 3 | 12.8 wt % | 5 | 12.8 wt % | — | — | — | — |
| Flavors, Sensates, Colors, & Other Minors | 4 | 3.1 wt % | 2-½ & 6-½ | 3.1 wt % | 2-½ & 3-½ | 7.0 wt % | 3 | 3.0 wt % |
| Water | 5 | 1.0 wt % | — | — | 3 | .9 wt % | — | — |
| Lecithin | — | — | — | — | 3 | .1 wt % | 1 | .1 wt % |
| Sorbitol, in solution | — | — | — | — | 3 | 15.5 wt % | — | — |

Process: The above ingredients were added to the batch mixer and mixed in the numbered order above.
Gum was then sheeted, cut, wrapped, stored and evaluated.

The following examples illustrate, but do not limit, this invention.

Pellet and Tab chewing gums were made with the fluid A bulk material suitable for use in a chewing gum, which contains at least about 40 wt. % dry basis sorbitol, at least about 7 wt. % dry basis other than sorbitol, and no more than about 10 wt. % water, wherein the bulk material is amorphous and remains amorphous with shear. A chewing gum, comprising: a) a gum base; b) a flavor; and c) an amorphous bulk material, contains at least 40 wt. % dry basis sorbitol, at least 7 wt. % dry basis polyol other than sorbitol and no more than 10 wt. % water (sweetener of this invention). Scanning Electron Micrographs of the samples, versus controls produced with crystalline sorbitol bulk powder, were evaluated and the following was seen in the micrographs:

The compositions and methods of the present invention are capable of being incorporated in the form of a variety of enablement's, only a few of which have been illustrated and described above. The invention may be embodied in other forms without departing from its spirit or essential characteristics. The described embodiments are to be considered in all respects only an illustrative and not restrictive, and the scope of the invention, therefore, is indicated by the appended claims rather than by the foregoing description. All changes which come within the meaning and range of equivalency of the claims are to be embraced within their scope.

What is claimed is:

1. A bulk material suitable for use in a chewing gum consisting of:

a) at least 65 wt. % dry basis solids sorbitol;
b) about 5-20 wt. % dry basis solids maltitol;
c) no more than 2 wt. % dry basis solids glycerin; and
d) no more than 10 wt. % water;
wherein the bulk material has a glass transition temperature between 30-80° C. as measured by differential scanning calorimetry.

2. The bulk material of claim 1, wherein the bulk material is amorphous.

3. The bulk material of claim 1, wherein the bulk material has a Tg of 40-70° C. as measure by differential scanning calorimetry.

4. The bulk material of claim 1, wherein the bulk material has a Tg of 45-60° C. as measured by differential scanning calorimetry.

5. The bulk material of claim 1, wherein the bulk material comprises not more than 6 wt. % water.

6. The bulk material of claim 1, wherein the bulk material comprises a refractive index of 1.3-1.8 at 20° C.

7. The bulk material of claim 1, wherein the bulk material comprises a refractive index of 1.5-1.6 at 20° C.

8. The bulk material of claim 1, wherein the bulk material comprises no more than 0.5 wt. % dry basis solids glycerin.

9. The bulk material of claim 1, wherein the bulk material will not crystallize in less than 10 hours when stored at not less than 70° C.

10. The bulk material of claim 1, wherein the bulk material has a viscosity of 10,000 cps-15,000 cps at 140° F.

11. The bulk material of claim 1, wherein the bulk material has a viscosity of 30,000 cps-50,000 cps at 130° F.

12. A chewing gum, comprising:
a) a gum base;
b) a flavor; and
c) a bulk material of claim 1.

13. The chewing gum of claim 12, wherein the bulk material has a Tg of 45-60° C., a refractive index of 1.5-1.6 at 20° C., and a viscosity of 10,000-15,000 cps at 140° F.

14. A method of producing the chewing gum of claim 12, comprising the steps of: mixing the bulk material with the gum base; wherein the difference in the temperature between the bulk material and gum base is less than 30° C. at the time of mixing.

15. The method of claim 14, wherein the temperature of the bulk material is not greater than 60° C.

16. The method of claim 14, wherein the bulk material has a glass transition temperature lower than the gum base temperature.

17. A method of making the bulk material of claim 1, comprising the steps of:
a) supplying a starting material consisting of at least 65 wt. % dry basis solids sorbitol, 5-20 wt. % dry basis solids maltitol, not more than 2 wt. % dry basis solids glycerin, and at least 25 wt. % water to an evaporator;
b) reducing the water content of the mixture to no greater than 10 wt. % water by evaporation; and
c) reducing the evaporated mixture temperature from about 75-90° C. to about 35-65° C. in such a way as to not crystallize the sorbitol or maltitol.

18. The method of claim 17, wherein the evaporation is conducted under vacuum.

19. The method of claim 17, wherein the evaporation and/or temperature reduction is conducted using a Plate Heat Exchanger.

20. The method of claim 17, wherein the evaporation and/or temperature reduction is conducted using a Tube-in-Tube evaporator.

* * * * *